US012668183B2

(12) United States Patent　　　(10) Patent No.:　US 12,668,183 B2
　　Goral et al.　　　　　　　　　　(45) Date of Patent:　Jun. 30, 2026

(54) CONTROL SYSTEM FOR REAR VIEW DEVICES IN A VEHICLE

(71) Applicant: Aptiv Technologies AG, Schaffhausen (CH)

(72) Inventors: Adrian Goral, Cracow (PL); Kamil Lelowicz, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 71 days.

(21) Appl. No.: 18/749,077

(22) Filed: Jun. 20, 2024

(65) Prior Publication Data

US 2025/0001936 A1　　Jan. 2, 2025

(30) Foreign Application Priority Data

Jun. 30, 2023　　(EP) ..................................... 23182813

(51) Int. Cl.
　B60R 1/02　　　　　(2006.01)
　G06V 20/59　　　　(2022.01)

(52) U.S. Cl.
　CPC ..................................... B60R 1/025 (2013.01)

(58) Field of Classification Search
　CPC .......... B60R 1/025; B60R 1/07; B60W 50/14; B60W 40/08; G06V 20/597; G06V 20/59
　See application file for complete search history.

(56) References Cited

U.S. PATENT DOCUMENTS

| | | |
|---|---|---|
| 7,571,041 B2 | 8/2009 | Lee |
| 8,297,763 B2 | 10/2012 | Lee |

| | | | |
|---|---|---|---|
| 8,702,250 B2 | 4/2014 | Raz | |
| 9,073,493 B1 * | 7/2015 | Yun ....................... | G02B 7/1827 |
| 9,598,015 B1 * | 3/2017 | Pertsel ................. | G06V 20/597 |
| 10,043,083 B2 | 8/2018 | Ding | |
| 2005/0111117 A1 * | 5/2005 | Qualich .................. | B60R 1/081 |
| | | | 359/877 |
| 2010/0177413 A1 | 7/2010 | Lee | |
| 2013/0155534 A1 * | 6/2013 | Sala ........................ | B60R 1/072 |
| | | | 359/843 |
| 2015/0092056 A1 | 4/2015 | Rau | |
| 2015/0210218 A1 * | 7/2015 | Kuenzner ................. | B60R 1/06 |
| | | | 701/49 |
| 2015/0224931 A1 * | 8/2015 | Sulc ....................... | B60R 1/1207 |
| | | | 359/872 |

(Continued)

FOREIGN PATENT DOCUMENTS

| | | |
|---|---|---|
| DE | 102013205287 | 10/2013 |
| WO | 2023001145 | 1/2023 |

OTHER PUBLICATIONS

Communication pursuant to Article 94(3) EPC received for EP23182813.8 dated Sep. 19, 2025, 4 pages.

(Continued)

*Primary Examiner* — Tan Q Nguyen
(74) *Attorney, Agent, or Firm* — Miller Johnson

(57)　　　　　ABSTRACT

A vehicle system includes at least one rear view device, a sensor, and at least one processor. The sensor is for capturing data relating to a vantage point of an occupant within a vehicle. The processor is configured to (i) determine, from the captured data, a vantage point characteristic and (ii) based on a classification of the determined characteristic, generate a signal for adjusting a field of view of the at least one rear view device.

13 Claims, 1 Drawing Sheet

(56)     References Cited

U.S. PATENT DOCUMENTS

| | | | | |
|---|---|---|---|---|
| 2015/0232033 A1* | 8/2015 | Bouaziz | .............. | G06V 20/597 |
| | | | | 701/49 |
| 2015/0239398 A1* | 8/2015 | Kaplan | .................. | G06F 3/013 |
| | | | | 701/49 |
| 2016/0176371 A1* | 6/2016 | Coleman | ................. | B60R 1/025 |
| | | | | 701/49 |
| 2016/0185295 A1 | 6/2016 | Lu | | |
| 2018/0043829 A1 | 2/2018 | Cordell et al. | | |
| 2018/0334102 A1 | 11/2018 | Zafeirakis | | |
| 2019/0381938 A1 | 12/2019 | Hopkns | | |
| 2020/0031278 A1 | 1/2020 | Zafeirakis | | |
| 2020/0369206 A1* | 11/2020 | Baltaxe | .................... | B60R 1/12 |
| 2021/0213879 A1* | 7/2021 | Sedaghat Amoli | ... | G06F 3/0487 |
| 2021/0229601 A1* | 7/2021 | Hu | .......................... | B60R 1/072 |
| 2022/0032846 A1 | 2/2022 | Kozono | | |

OTHER PUBLICATIONS

Extended European Search Report for EP23182813, dated Nov. 22, 2023, 6 pages.

* cited by examiner

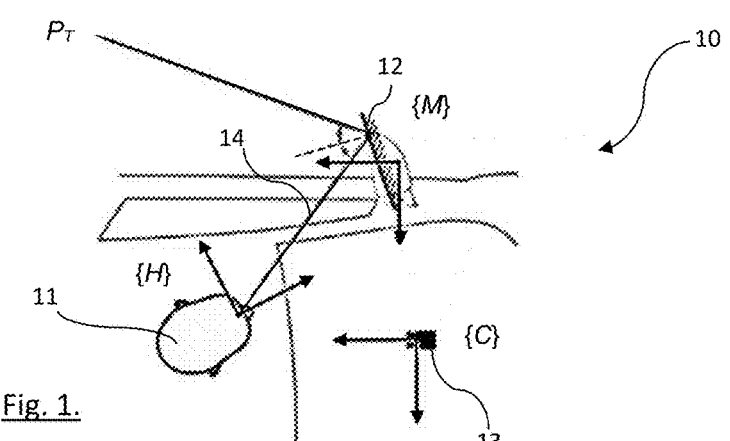
Fig. 1.
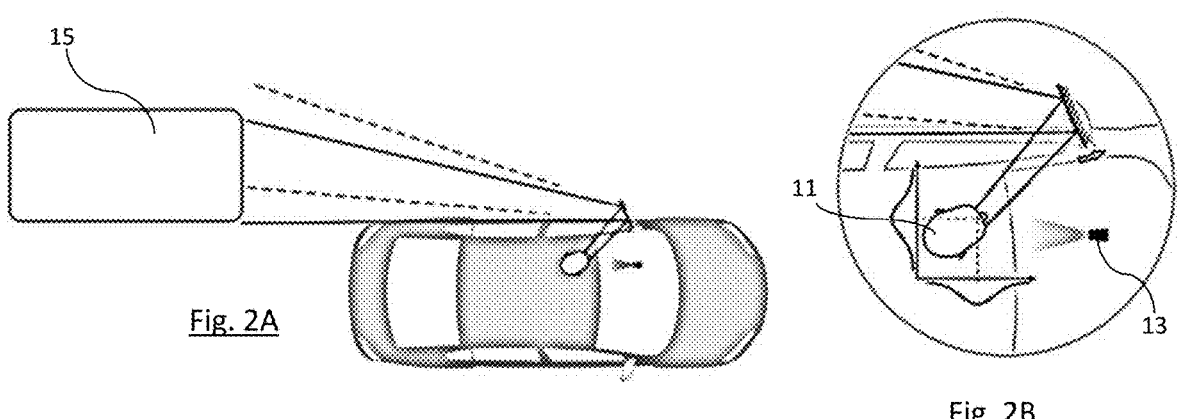
Fig. 2A
Fig. 2B
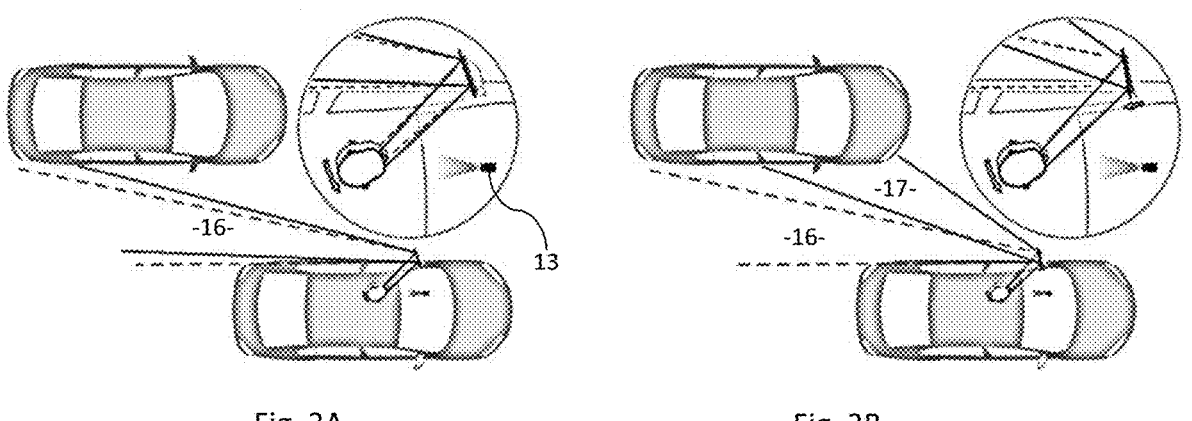
Fig. 3A.
Fig. 3B

CONTROL SYSTEM FOR REAR VIEW DEVICES IN A VEHICLE

CROSS-REFERENCE TO RELATED APPLICATIONS

This application claims priority to EP 23 182 813 filed Jun. 30, 2023, the entire disclosure of which is incorporated by reference.

FIELD

The present disclosure relates to a control system for rear view devices in a vehicle, particularly an adaptive system for controlling the display angle of objects in a rear view mirror or display relative to a driver.

BACKGROUND

In road vehicles, rear-view and side mirrors are vital for safe driving, ensuring a driver has an adequate view of any other vehicles and/or other road users behind or closely adjacent their vehicle. However, once the mirrors have been initially adjusted by a driver, e.g. for their relative height and comfort, the field of view (FOV) in the mirrors usually remains fixed in the vehicle's reference frame. As a result, visibility in the mirrors is sufficient if the driver's viewing perspective stays within a limited range of movement within the cabin of the vehicle but, once the driver changes his driving position, visibility through the mirrors becomes suboptimal. Readjustment of a mirror for a better view may be desired by the driver, but this cannot necessarily be done easily or safely during driving.

Another limitation of having the mirror view fixed in the vehicle's reference frame is that a standard or default adjustment of mirrors is valid for driving only in "normal" driving scenarios, where the vantage point of the driver remains the same as during pre-drive mirror adjustment. For example, drivers tend to adjust mirror positions when stationary, in anticipation of the visibility they will need for normal driving in a forward direction on a street or highway, relative to a neutral position of their head.

However, the mirrors may not provide adequate visibility of critical objects if the road is not straight, i.e. while driving on a road with high curvature or quickly changing slope. Some visibility limitations are also related to the car's geometry, such as the well-known rear quarter blind spot. As mentioned, attempts to manually adjust (including activating directional buttons of a motorized mirror adjustment system) are dangerous while driving because attention is diverted from the road.

Limited visibility in vehicle mirrors has been addressed in the prior art. For example, in one group of solutions, it is proposed to better estimate the driving scenario/surrounds of the vehicle itself, i.e. by determining whether the vehicle is traveling on a curve or on a hill, and making pre-defined adjustments of mirror position, with a subsequent effect on viewing angles accordingly. Such adjustment is accomplished by monitoring the signals available from a vehicle's onboard sensors, e.g. steering wheel angle, yaw rate, state of turn indicators, or GPS coordinates.

A second approach for dynamic adjustment during driving of a mirror attempts to monitor the vantage point of the driver, based on the data available about a position of driver's body. This can be done indirectly, e.g. by measuring the orientation of individual components of a driver's seat. Examples of prior patent publications relevant to the background of the disclosure include U.S. Pat. Nos. 7,571,041, 8,297,763 and US2010/0177413.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to the above, there is a need to provide further adjustment options for mirror systems in vehicles. At the least, the disclosure seeks to provide an alternative automatic rear view device control system for drivers and automotive manufacturers to choose from.

According to a first aspect, a control system for adaption of a mirror or other rear view display device to a plurality of driving scenarios of a vehicle is provided according to claim 1 of the appended claims. The vehicle system comprises: at least one rear view device (e.g. a reflective mirror or video display); a camera for capturing image data relating to an occupant (e.g. a vantage point of a driver) within a vehicle; and at least one processor configured to monitor a characteristic deviation and/or movement of at least part of the body of the occupant from captured image data, and cause a change of the field of view of the rear view image device in response to the characteristic and/or movement being detected. In a particular form, the adjustment in FOV is proportional to the detected behavior/movement, as opposed to, say, a predefined adjustment.

In this way, a solution is provided for adapting the field of view (FOV) in one or more rear-view mirrors based on the behavior/characteristic and movement of the user, e.g. changing vantage point. In other words, rear view images may be adjusted for an optimal FOV depending on the needs of the driver. The system enables determination of a vantage point (e.g. eye level) of the occupant and decides whether that vantage point can be improved, i.e. by adjusting the rearward facing FOV.

The term "rear view device" or "image device" in the context of the disclosure is a safety device for a driver to see behind their sitting position, whether it be by way of a reflective mirror (e.g. classic "wing" mirrors or central "rear view" mirrors) or a video display for showing an image associated with a rear facing camera, which display may be located at a side position or center console. Generally, the rear view image will be a mirror image such that a moving object behind the observer can be intuitively tracked by seeing an image of same in front of the observer.

In other words, the proposed method of interaction is compatible not only with physical actuated mirrors, but also with the camera-based rear view mirrors (e-mirrors) that are becoming more commonplace. In fact, the disclosure herein can render eMirror technology more intuitive and therefore easier to adopt by drivers, by changing the image perceived by the driver according to the principles of classical ray optics, despite the mirrors being virtual. For example, in one form, a rear view camera can magnify the image when the driver leans towards the screen and de-magnify it when he leans back to have a broader view of the surroundings.

In embodiments, the system is configured to operate in at least two modes. A first mode may correspond to monitoring the behavior and/or movement of at least part of the body of the occupant over an extended time period. In this way, a change in the driver's posture can be detected and the FOV, viewing angle, adjusted to account for the change in posture over time.

A second mode may correspond to monitoring the behavior and/or movement of at least part of the body of the occupant for a more immediate movement, i.e. over a short time period. In this way, a change in the driver's position, such as leaning in a particular direction, can be detected and the FOV, viewing angle, temporarily adjusted to an enhanced FOV. For example, if a driver leans to one side, this indicates a desire to see a greater angle to the opposite side of the vehicle such as for overtaking. The adjustment returns to the pre-adjustment position which corresponds to straight road driving, with the driver's body in a neutral position.

In embodiments, the processor generates a control signal if monitored behavior/movement is outside a predetermined threshold. The control signal may activate a motor associated with a rear view reflective mirror to angularly adjust the mirror or, in the case of an "eMirror", cause a camera to move or otherwise angularly adjust its FOV, for corresponding display on the mirror-image rear view display.

In embodiments, the processor is configured to track, through the captured image data, a position and/or orientation of the driver's head from the image data. In this way it can be determined whether a driver is: (i) looking forward, but their position is changing over time (such as slouching/sinking into their seat); (ii) looking at a rear view mirror; and/or (iii) whether the driver is leaning toward or away from the rear view display.

In this way, the system enables continuous (or periodic at intervals or abrupt) re-adjustment of a vehicle mirror, relative to the current viewing point of the driver. Particularly, the disclosure recognizes additional requirements on new cars regarding in-cabin cameras, and driver monitoring. The system identifies and takes advantage of advanced driver monitoring systems already capable of tracking position and orientation of driver's head, and their gaze direction. The collected data can be processed to measure a driver's vantage point directly. Position data can also be evaluated to detect the driver's intention to check a particular region around the car.

Particularly, available driver monitoring systems (DMS) with 3D tracking capabilities report the spatial transformation (translation and rotation) of a driver's head in an arbitrary coordinate system defined in the reference frame of the vehicle. This enables an estimate to be deduced of the point from which the driver views the car and its surroundings (vantage point). For simplicity, herein it is generally assumed that the vantage point is the midpoint between the driver's eyes.

The disclosure herein enables different use case scenarios, such as adapting rear-view mirrors to eliminate blind spots, adapt during parking, highlight objects, etc. The disclosure is embodied by an algorithm, the system and the use cases/modes.

A method according to the disclosure is outlined according to claim 11; e.g. comprising steps of determining a vantage point of a driver, relative to a rear view image device, from data captured by a driver monitoring system; determining whether a behavior, corresponding to movement of at least a part of the driver's body as captured by the driver monitoring system, causes a deviation from the determined vantage point; adjusting a field of view of the rear view image device in response to the deviated vantage point. In this way, the vantage point of a driver can be determined and, if needed, the FOV of a rear view mirror adjusted to improve that vantage point. Compensation for a deviation in vantage point is a possible mode of operation of the control method, i.e. applicable in regular forward driving scenarios. Another mode is the deviation being used as a trigger for other types of mirror adjustment in anticipation of driver's intentions, such as amplified deflection towards blind spot.

According to a third aspect, there is provided a non-transitory computer readable medium including instructions, which when executed by one or more processors, implement the foregoing method. According to a further aspect, there is provided a computer software product including instructions which, when executed by one or more processors, implement the above method.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 1 illustrates a schematic diagram of a vehicle mirror system, i.e. a wing mirror, relative to a driver's head position.

FIGS. 2A and 2B illustrate a schematic plan and detailed view respectively of a vehicle mirror system according to a first scenario.

FIGS. 3A and 3B illustrate schematic views, each with plan and detail views respectively, of a vehicle mirror system according to a second scenario.

In the drawings, reference numbers may be reused to identify similar and/or identical elements.

DETAILED DESCRIPTION

The following description presents example embodiments and, together with the drawings, serves to explain principles of the disclosure. However, the scope of the disclosure is not intended to be limited to the precise details of the embodiments or exact adherence with all features and/or method steps, since variations will be apparent to a skilled person and are deemed also to be covered by the description. Terms for components used herein should be given a broad interpretation that also encompasses equivalent functions and features. In some cases, several alternative terms (synonyms) for structural features have been provided, such as by use of "/" symbol to suggest interchangeability, but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "sideways", "upper" and "lower" are used for convenience of explanation usually with reference to the form shown in illustrations and are not intended to be ultimately limiting if an equivalent function can be achieved with an alternative dimension and/or direction. All directional terms are relative to each other.

The description herein refers to embodiments with particular combinations of steps or features, however, it is envisaged that further combinations and cross-combinations of compatible steps or features between embodiments will be possible. Indeed, isolated features may function independently as a disclosure from other features and not necessarily require implementation as a complete combination.

It will be understood that the illustrated embodiments show applications only for the purposes of explanation. In practice, the disclosure may be applied to many different configurations, where the embodiment is straightforward for those skilled in the art to implement.

A rear view mirror system is shown in FIG. 1. This represents the general concept of the disclosure, simplified to two dimensions. Particularly, the system 10 operates based on a spatial relationship between a driver's vantage point, known from the coordinate system {H} of a driver's head 11, and the surface of a mirror 12, having its own coordinate system {M}. The reflective surface is described by a function of the general form:

$$f_m(x,y,z|\theta,\varphi)$$

where θ and φ are orientation angles of mirror 12, controlled by actuators

Given a most extreme point of some predefined target area, PT, the mirror should be adjusted so that the reflection of that point appears on the edge of the mirror 12, when the mirror is viewed from the vantage point of the driver's head 11. The spatial transformation between the coordinate system {C} of a DMS camera 13 and mirror coordinate system {M} must be known in order to find the relative position of the driver's vantage point in the mirror's coordinate system, which is essential for calculating the angle of incidence of a line 14 originating from the vantage point at a driver's head 11 and being reflected at the mirror's surface 12.

The basic principle described above can be implemented for dynamic mirror adjustment relative to at least two automatic behaviors. For example, enhancing a driver's FOV in rear-view mirrors, for: (1) targeting a regular driving scenario, with the vehicle moving forward, with no lateral maneuvers for a longer period of time, but where the driver may involuntarily change position, and (2) for lane change/turning scenario that requires the driver to carefully check, making a conscious/voluntary movement, for any surrounding vehicles towards the left and right of the ego vehicle. A third behavior may be observed during parking where a driver desires to see, again by an intentional movement, a low angle where a curb is visible relative to the rear wheel.

A first mode, forward driving scenario, is outlined with reference to FIGS. 2A and 2B.

The first mode is intended to track the average vantage point over a long period of time, based on long-term distribution of vantage point position, as measured by a DMS system, and to adjust the rear-view mirrors accordingly. This implementation helps maintain an optimal adjustment of the mirrors in case the position of the driver gradually changes over time (e.g. when driving over a long distance a driver may gradually slouch more into the driver's seat).

The vantage point distribution is modelled using a 3-dimensional function, such as a Gaussian function, which is constantly updated with new measurements of head position. The expected value of the model function is assumed to be the most typical vantage point. This point is used to adjust the mirror 12 in such a way that it reflects a largest part of a pre-defined target zone 15. According to FIG. 2A, automatic adjustment of side-view mirror 12 is shown where dashed lines indicate FOV before adjustment and solid lines indicate FOV after adjustment, based on average vantage point.

The vantage point distribution monitoring is to be more affected with most recent DMS measurements than with older ones. In this way, the measurements older than a predefined threshold age are disregarded when calculating the distribution. The rejection threshold may be a tunable parameter, which enables a good compromise between responsiveness of the system (i.e. its capability to always provide the best possible FOV) and stability of the mirror image. It is notable that rapid/jerky adjustments of the mirror may be undesirable or even disorienting for the driver. Therefore, mirror adjustment in the first mode may be practically imperceptible for the driver and implement a gradual proportional movement according to the driver's current head location.

It should be clear from the foregoing that body and/or head position is monitored over time in order for the mirror control system to implement subtle readjustment which provides an optimum FOV for a regular forward driving scenario. FIG. 2B shows a schematic representation of a driver's head where a distribution of position points (e.g. bell curve) are plotted, e.g. distributions of most recent vantage points along two dimensions of space, which represents that the system creates and constantly updates a model of vantage point positions to determine the most typical vantage point and all momentary deviations from it. In practice, the distribution would be a three-dimensional function, what is shown is a schematic representation of this. This is merely to assist monitoring and determine whether the head is straying from the neutral position the mirrors are set for, indicating a new vantage point and necessitating an adjustment to the FOV of the mirror. Notably, both mirrors may be adjusted simultaneously to account for a change in position in all modes.

A variant of the above is also useful when multiple drivers of different body dimensions share the same car, since there will be no need to (remember to) manually readjust the mirrors each time the driver changes. Adjustment of mirrors to a new driver may be implemented over a shorter time period, i.e. from when the new driver first starts operating the vehicle, the DMS may detect a new driver/body dimensions and immediately adjust rear view device FOV accordingly.

A second mode, corresponding to a lateral maneuver scenario (blind spot peek/mitigation), is illustrated by reference to FIGS. 3A and 3B.

Firstly, by way of background, it is important to note that according to use of a conventional (i.e. effectively fixed in one semi-permanent position until manually adjusted) mirror, drivers can be observed to slightly extend the FOV towards the left or right side of the vehicle by leaning in the opposite direction. However, such an extended view is typically insufficient for a driver to see the vehicles in a rear quarter blind spot. For example, FIG. 3A shows the conventional scenario, either prior to adjustment according to the disclosure or with a fixed mirror, where leaning to the right while looking at the mirror to the left provides only a slight enhancement of blind spot visibility, indicated by the solid lines of region 16, compared to the dashed lines where the driver is in normal forward driving position (not leaning, but merely looking at the mirror).

However, when detected correctly using camera 13, the leaning movement itself is a useful indication of a driver's intention to check the blind spot and can be used as a behavioral event, monitored by the DMS, to trigger a temporary deflection of the mirror 12 and help the driver to see the desired region, e.g. region 17 in FIG. 3B, which in the illustration encompasses a second vehicle previously within the blind spot.

According to this mode, the behavior of leaning to the right triggers a deflection of the mirror (with the edge closest to the driver pivoting toward the driver and the mirror overall rotating clockwise), that amplifies the change of FOV from the leaning head movement, compared to what would normally be possible with a fixed mirror, thus enabling the driver to see the second vehicle in the blind spot.

In an example form, the mirror may be adjusted by detecting both a head rotation toward the mirror (because it is assumed a driver is looking at the mirror for driving assistance) and a leaning movement. Detection of one or both of these movements indicates a desire by the driver to obtain a better view/vantage point. Accordingly, upon detection of the behavior, the mirror is temporarily deflected to provide that better view until the movement is detected as ended (i.e. head back to neutral/centered/forward facing) and/or until a predetermined time period has elapsed, say 3-8 seconds.

According to the above, the mirror/rear view display angular control system of the disclosure may have a first mode, related to regular driving conditions where a driver's head is by and large in a neutral position facing forward, and a second mode where a "blind spot peek" feature is activated in response to the DMS system detecting a distinct momentary deviation from the average vantage point towards left or right side of the vehicle, or up or down. Such deviation triggers the second mode and (e.g. proportionally) changes the mirror's FOV, as if it amplified the normally occurring change in the viewing angle as a result of leaning/extending.

As noted, after activation of the second mode the mirror may return to its original position after a predetermined, i.e. short, period of time, or when the DMS system detects that the measured vantage point has returned to the vicinity of its average position, e.g. the driver is no longer leaning to one side.

The illustrated embodiment shows an example of left side wing mirror on a left-hand drive vehicle, however, it will be apparent that the right side mirror can be similarly automated to deflect upon detection of a lean or like movement event. The same principles apply to a right-hand drive vehicle in order to mitigate the driver's side blind spot. Further, both mirrors may be adjusted simultaneously upon detection of a behavioral event.

Principles of the disclosure are also applicable to digital mirrors where a camera FOV and corresponding display is modified depending on DMS observations, i.e. to provide an optimal field of view for the driver in response to movement events of the driver's body and/or head.

Additional or supplemental modes of the control system may implement prior art features such as monitoring curvature of the road and/or position of driver's seat to derive additional data for determining vantage point. A variant may use activation of a turning signal as a trigger for FOV adjustment.

What is particularly noteworthy about the concept disclosed herein is the ability to activate a mode, such as for overtaking, etc. by a deliberate movement, e.g. driver initiated action that is a predefined, intuitive/natural and overt movement of body. The detected movement for switching modes should be effortless and not interrupt the driving process, as manual adjustment of a mirror would. The FOV can be adjusted without the need for an additional triggering event such as activating an indicator signal.

The proposed method of interaction disclosed herein is compatible not only with physical actuated mirrors, but also with the camera-based rear view mirrors (e-mirrors). In fact, the present concept can make this technology more intuitive and therefore easier to adopt by drivers, i.e. changing the image perceived by the driver according to the principles of classical ray optics, despite the mirrors being virtual.

In a further example, a rear view camera may magnify an image when the driver leans towards the screen and de-magnify it when he leans back, to enable a broader view of the surroundings.

Particular use case scenarios that implement the concept disclosed herein include: adapting rear-view mirrors to eliminate blind spots and adaption during parking, e.g. by detecting a driver's upwards extension movement to make oneself taller/shorter and obtain a higher/lower angle view with a better vantage point of a vehicle's rear tire to avoid hitting/scraping a curb. This is particularly useful for adjustment of the passenger side mirror, because that will tend to be the side adjacent to a curb during parallel parking, and also the side furthest from the driver where it is more difficult to gauge the width of the vehicle.

The change in FOV may have corresponding effect on objects being identified/highlighted in a digital image display.

According to the above, it should be clear that behavior and movement can be detected in three-dimensional space, e.g. to lean in one direction and/or while lifting up from the driver's seat to give more height, which may trigger a complimentary/amplifying (e.g. proportional) mirror adjustment that is likewise three dimensional, such as simultaneously deflecting in the opposite direction and tilting downward.

In general, the disclosure can be summarized as an improvement in vehicle rear view control systems with particular application to reflective and e-mirror technology.

Broadly, a digital mirror system of the vehicle comprises cameras located at positions emulating rearward/sidewards facing mirrors.

By way of summary, a vehicle control system as described herein utilizes a driver monitoring system to monitor the vantage point, e.g. correlated to movement of a driver, to detect and classify a behavior/characteristic such as leaning into or away from the mirror. Detection of the change in vantage point may be used to dynamically deflect the mirror to adjust its field of view. Such an adjustment is useful in scenarios such as prior to overtaking (e.g. to see into a blind spot) and when parking (e.g. to automatically alter the field of view to a lower angle for seeing a rear wheel and its proximity to a curb). The movement may be proportional or not. For example, the mirror may deflect by a proportional amount to the amount of lean, even if deflection is amplified; or it may be that a slight lean above a threshold is sufficient to indicate an intention to obtain a better vantage point and the mirror may deflect by a maximum or other suitable amount.

The system may alternate between modes, such as from a default driving mode, where long-term posture of the driver is monitored to determine whether subtle adjustment is needed to the rear view mirror to compensate for a driver slouching over time, and one or more modes in response to more immediate, voluntary and deliberate movements.

Essentially, the vantage point of an occupant is monitored to classify characteristics based on any deviations thereof, i.e. a change from driver starting position. If a characteristic is identified then the system can elect to adjust the rear view device (e.g. display or mirror).

In embodiments, additional input data may be gathered such as a reversing signal, indicator, etc. The characteristic may be classified as a gradual deviation over time, parking maneuver, overtaking, or other suitable driving circumstance.

In a particular form, the system may incorporate a training function, such as to help improve the system's use over time. For example, a driver/occupant may be able to provide feedback, such as to confirm a successful implementation of a classified characteristic. Such training may be undertaken when the vehicle is stationary or moving, subject to safety considerations.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A vehicle system comprising:
at least one rear view device;
a sensor for capturing data relating to a vantage point of an occupant within a vehicle; and
at least one processor configured to:
(i) determine, from the captured data, a vantage point characteristic, and
(ii) based on a classification of the characteristic, generate a signal for adjusting a field of view of the at least one rear view device, wherein:
the classification is determined by reference to an average or neutral vantage point of the occupant determined from captured data,
a forward driving detection mode is executed by classifying the characteristic from a deviation in the average or neutral vantage point corresponding to a change in posture over an extended period of time, and
the adjustment to the field of view is practically imperceptible to the occupant by implementing a gradual proportional movement.

2. The vehicle system of claim 1 wherein the at least one processor is configured to execute a temporary movement detection mode by classifying the characteristic from a temporary change in vantage point by the occupant.

3. The vehicle system of claim 2 wherein the at least one processor is configured to restore the field of view of the at least one rear view device to its state before the temporary change was detected.

4. The vehicle system of claim 3 wherein restoration of the field of view occurs after a predetermined time or in response to the temporary movement detection mode ending.

5. The vehicle system of claim 2 wherein the temporary change by the occupant corresponds to a lean and/or attempt to gain/lose height relative to the at least one rear view device.

6. The vehicle system of claim 1 wherein:
the at least one rear view device is a reflective mirror; and
the reflective mirror includes an actuator configured to adjust the mirror in response to the signal.

7. The vehicle system of claim 6 wherein the at least one processor accepts an additional input from the occupant for implementing at least one of: a training function, a reversing function, or activation of an indicator.

8. The vehicle system of claim 1 wherein the at least one rear view device is a visual display for showing an image associated with a rear-facing camera mounted on the vehicle.

9. The vehicle system of claim 8 wherein the visual display is configured to cause an enlargement of the image dependent on the classified characteristic.

10. A method of controlling rear view functions in a vehicle, the method comprising:
determining an average or neutral vantage point of a driver, relative to a rear view device, from data captured by a driver monitoring system;
classifying a vantage point characteristic, corresponding to a change from the determined average or neutral vantage point; and
adjusting a field of view of the rear view device in response to a determined behavior, wherein:
the characteristic includes at least a forward driving detection mode corresponding to a change from the average or neutral vantage point of the driver over an extended period of time, and
the adjustment to the field of view is practically imperceptible to an occupant within a vehicle by implementing a gradual proportional movement.

11. The method of claim 10 wherein:
the characteristic includes a temporary movement detection mode corresponding to a temporary change in vantage point by the driver over a short period of time; and
the adjustment to the field of view is temporary and returns to a pre-adjustment state after a predetermined time period and/or upon end of movement.

12. A non-transitory computer-readable medium comprising instructions including:
determining an average or neutral vantage point of a driver, relative to a rear view device, from data captured by a driver monitoring system;
classifying a vantage point characteristic, corresponding to a change from the determined average or neutral vantage point; and
adjusting a field of view of the rear view device in response to a determined behavior, wherein:
the characteristic includes at least a forward driving detection mode corresponding to a change from the average or neutral vantage point of the driver over an extended period of time, and
the adjustment to the field of view is practically imperceptible to an occupant within a vehicle by implementing a gradual proportional movement.

13. The non-transitory computer-readable medium of claim 12 wherein:

the characteristic includes a temporary movement detection mode corresponding to a temporary change in vantage point by the driver over a short period of time, and the adjustment to the field of view is temporary and returns to a pre-adjustment state after a predetermined time period and/or upon end of movement.

* * * * *